(12) United States Patent
Engelhardt (10) Patent No.: US 10,739,602 B2
(45) Date of Patent: Aug. 11, 2020

(54) CHROMATIC PHASE PLATE

(71) Applicant: Deutsches Krebsforschungszentrum, Heidelberg (DE)

(72) Inventor: Johann Engelhardt, Bad Schoenborn (DE)

(73) Assignee: DEUTSCHES KREBSFORSCHUNGSZENTRUM, Heidelberg (DE)

( * ) Notice: Subject to any disclaimer, the term of this patent is extended or adjusted under 35 U.S.C. 154(b) by 294 days.

(21) Appl. No.: 15/956,141

(22) Filed: Apr. 18, 2018

(65) Prior Publication Data

US 2018/0231788 A1 Aug. 16, 2018

Related U.S. Application Data

(63) Continuation of application No. PCT/EP2016/075116, filed on Oct. 19, 2016.

(30) Foreign Application Priority Data

Oct. 19, 2015 (EP) .................................... 15190382

(51) Int. Cl.
*G02B 21/06* (2006.01)
*G02B 27/09* (2006.01)
(Continued)

(52) U.S. Cl.
CPC ....... *G02B 27/0927* (2013.01); *G02B 5/3083* (2013.01); *G02B 21/0032* (2013.01);
(Continued)

(58) Field of Classification Search
CPC ... G02B 1/00; G02B 1/08; G02B 5/00; G02B 5/30; G02B 5/3083; G02B 21/00;
(Continued)

(56) References Cited

U.S. PATENT DOCUMENTS 4,175,830 A * 11/1979 Marie .................. G02B 5/3083
359/280
8,390,928 B2 * 3/2013 Baer .................. G02B 27/0927
359/489.01

(Continued)

FOREIGN PATENT DOCUMENTS

EP 1 622 137 A1 2/2006
WO 2011/086519 A1 7/2011

OTHER PUBLICATIONS

Wildanger, Dominik, et al., "A STED Microscope Aligned by Design", Optics Express, vol. 17, No. 18, Aug. 31, 2009 (11 Pages).

*Primary Examiner* — Arnel C Lavarias
(74) *Attorney, Agent, or Firm* — Thomas | Horstemeyer, LLP (57) ABSTRACT

A segmented chromatic phase plate includes at least three stacks. The three stacks are arranged around and stacked along a main axis, and have same overall heights. Each stack includes at least two plane-parallel optical flats of different materials. The materials and the thicknesses of the optical flats are selected such that optical path lengths of light of a first wavelength passing through the different stacks along the main axis differ by integer multiples of the first wavelength, whereas optical path lengths of light of a second wavelength differ by integer multiples plus defined fractions of the second wavelength. The materials of the at least two optical flats have different refractive indices for both the first and second wavelengths; and derivatives of the differences between the optical path lengths with respect to wavelength are zero at at least one of the first and second wavelengths.

19 Claims, 5 Drawing Sheets

(51) Int. Cl.
  *G02B 21/00* (2006.01)
  *G02B 5/30* (2006.01)
  *G02B 27/42* (2006.01)
  *G01N 21/64* (2006.01)

(52) U.S. Cl.
  CPC ......... *G02B 21/0076* (2013.01); *G02B 21/06* (2013.01); *G02B 27/42* (2013.01); *G01N 2021/6419* (2013.01)

(58) Field of Classification Search
  CPC ............ G02B 21/0004; G02B 21/0032; G02B 21/0052; G02B 21/0056; G02B 21/006; G02B 21/0064; G02B 21/0068; G02B 21/0076; G02B 21/06; G02B 21/08; G02B 21/082; G02B 21/36; G02B 21/361; G02B 27/0081; G02B 27/09; G02B 27/0927; G02B 27/0938; G02B 27/28
  USPC ....... 359/385, 362, 363, 368, 386, 387, 388, 359/390, 483.01, 489.01, 489.02, 489.05, 359/489.07
  See application file for complete search history.

(56) References Cited

U.S. PATENT DOCUMENTS

| | | | | |
|---|---|---|---|---|
| 8,699,132 | B2* | 4/2014 | Iketaki | G01N 21/6458 359/385 |
| 9,188,784 | B2* | 11/2015 | Baer | G02B 27/0927 |
| 9,310,595 | B2* | 4/2016 | Iketaki | G02B 21/0056 |
| 9,507,135 | B2* | 11/2016 | Iketaki | G02B 21/0076 |
| 2011/0310475 | A1 | 12/2011 | Iketaki | |
| 2013/0299716 | A1 | 11/2013 | Song | |
| 2014/0145093 | A1* | 5/2014 | Hendriks | G01N 21/64 250/459.1 |
| 2017/0138852 | A1* | 5/2017 | Baer | G02B 27/0927 |

* cited by examiner

CHROMATIC PHASE PLATE

CROSS REFERENCE TO RELATED APPLICATIONS

This application is a continuation to international application PCT/EP2016/075116 with an international filing date of Oct. 19, 2016 and claiming priority to European patent application No. 15 190 382.0 entitled "Chromatic phase plate", filed on Oct. 19, 2015.

FIELD

The present invention relates to a segmented chromatic phase plate comprising at least three stacks of plane-parallel optical flats made of different materials, the stacks being arranged around a main axis.

More particularly, the present invention relates to a segmented chromatic phase which may be used in STED or RESOLFT fluorescence light microscopy to shape wavefronts of a beam of stimulating light or fluorescence inhibiting light propagating along the main axis such that the beam, when focused to a focus point, displays a local intensity minimum at the focus point, whereas focused light of another wavelength, particularly fluorescence excitation light also passing through the phase plate along the main axis will still display a local intensity maximum at the focus point.

BACKGROUND

U.S. Pat. No. 8,390,928 B2 discloses a phase plate consisting of a pair of glass types which are selected such that, at a particular thickness for each glass in the pair, the phase difference in propagation of light through one glass of the pair is exactly one half wavelength relative to the other glass of the pair, for at least three different wavelengths. Where one glass of the pair is called A and has a thickness TA and the other class is B and has a thickness TB, eight squares of glass are made, two squares "A" of glass A of thickness TA, two squares "A*" of glass A of thickness TA/2, two squares "B" of glass b of thickness TB and two squares "B*" of glass B of thickness TB/2. Then the four sandwiches of the squares are arranged in a 2×2 quadrant square with a sandwich of glass A and A* in the upper left hand quadrant, of glass B and B* in the upper right hand quadrant, of glass B and A* in the lower right hand quadrant and of glass A and B* in the lower left hand quadrant. A light beam passing through this array, when focused to a focus point, will have a zero intensity central point at the focus point for each of the three wavelengths for which the half wavelength difference is exact and close to zero intensity for the intermediate wavelengths. This known phase plate is not configured to let a beam of light of another wavelength pass through unaffected such that, when focused to a focus point, it has a local intensity maximum at the focus point. Further, the sandwiches of this known phase plate are of different thicknesses.

International patent application publication WO 2011/086519 A1 discloses a phase modifying member inserted in a common optical path of both an excitation and a depletion beam of an STED fluorescence light microscope. The phase modifying member leaves the wavefronts of the excitation beam unchanged but changes the wavefronts of the stimulation or depletion beam so as to create an undepleted region of interest when focusing the depletion beam to a focus point. The phase modifying member has a surface with a plurality of regions of different heights along the common optical path. The heights are selected such that they change the phase of the excitation beam in modulus of 2 times $\pi$, whereas the phase modifying member modifies the phase of the depletion beam such that the modified phase as a function of the azimuthal angle around the common optical phase is approximately equal to the azimuthal angle. The phase modifying member has to be manufactured at a very high precision with regard to its regions of different heights to modify the phase of the depletion beam and to leave the wavefronts of the excitation beams substantially unchanged. Further, the optical element is only operating for two different wavelengths of the excitation beam on the one hand and the depletion beam on the other hand for which the phase modifying member is designed.

U.S. Pat. No. 8,755,116 B2 discloses a wavelength sensitive phase filter consisting of two pairs of optical wedges. The two pairs are arranged on opposite sides of a main axis; and the optical wedges are made of two different materials. The outer surfaces of the pairs of optical wedges are plane-parallel. For one light component of a first wavelength, there is a refractive index difference $\Delta n$ between the materials of the wedges. As a result, two parallel linear phase ramps with gradients in opposite senses are applied to the wavefronts of the one light component, as it passes through the phase filter. In contrast, the refractive indices of the materials of the wedges are identical for another light components of a second wavelength. As a result, the wavefronts of the other light component are not affected as they pass through the phase filter.

U.S. Pat. No. 8,755,116 B2 further discloses a modification of the above phase filter which is based on three different materials. Optical wedges of these three different materials are arranged with two different wedge angles, one angle between the first and second and a different angle between the second and third material. The second material junction, and possibly even more materials with further wedge angles, make(s) it possible to configure the profile of the overall dispersion curve in order to produce local plateaus in the dispersion curve over which the phase shift, normalized with respect to the wavelength, of the one light component does not change with the wavelength. In addition, three or more materials can be used to ensure that the wavefront of the other light component remains constant as it passes through the phase filter, if this is not possible using only two materials.

With regard to the phase filter with two pairs of optical wedges of two materials, U.S. Pat. No. 8,755,116 B2 incorporates a further document by reference: D. Wildanger et al., "A STED Microscope Aligned by Design", *Opt. Exp.* 17 (18), 16100-16110 (2009). This document states that an optimal phase filter for focal plane resolution enhancement in STED fluorescence light microscopy is a vortex which produces a linear increase in phase from 0 to $2\pi$ with increasing azimuthal angle about the beam axis of the STED light beam. Upon focusing, a circularly polarized STED light beam prepared in this way destructively interferes in the focal center and generates a zero-intensity minimum which is surrounded by a torus of high intensity. Besides optical wedges in a side by side arrangement producing two anti-parallel phase gradients, such a vortex phase filter may also be approximated by optical flats of constant phase. A phase filter consisting of six optical flats arranged around the beam axis already approximates the vortex well. For only modifying the wavefronts of the STED light beam but not affecting the wavefronts of an excitation light beam passing through the same phase filter, each of the six optical flats is made of two optical flats of materials whose refractive indices are equal at the excitation wavelength but notably differ at the STED wavelength. Particularly, the two materials are selected such that their refractive index difference is more than $5 \times 10^{-4}$ or about $10^{-3}$ at the STED wavelength. With equal thicknesses of all pairs of optical flats stacked along the beam axis, the phase shifts induced at the excitation wavelength are the same for all pairs such that the wavefronts of the excitation light beam are not deformed. The phase shift induced at the STED wavelength is a function of the diffractive index difference between the two optical flats of each pair at the STED wavelength and of the thicknesses of the two optical flats in each pair.

US patent application publication US 2011/0310475 A1 discloses a microscope forming a beam spot in a desired shape in a focal plane. The microscope comprises a modulation optical element having a plurality of regions for spatial modulation of illumination light, and an adjustment element for adjusting an optical property of the illumination light modulated by the modulation optical element. The optical element may be a phase plate having a plurality of regions of different phase shifts for erasing light such that the erasing light once focused comprises a zero point in the focus. In the different regions, the phase plate of the known microscope is coated with an optical film being an optical multilayer. Different spatial arrangements of these regions and different relative phase shifts are disclosed to achieve the desired result of the zero point in the focus.

European patent application publication EP 1 622 137 A1 discloses an optical diffraction element to be disposed in an optical path through which a plurality of light beams of different wavelength travel. The optical diffraction element has a periodic structure which, when a first light beam having a first wavelength is in a linearly polarized state polarized in a first direction, allows the first light beam to be substantially completely transmitted thereto, but when the first light beam is in a linear polarized state polarized in a second direction perpendicular to the first direction, causes the first light beam to be substantially completely diffracted. In the periodic structure of the optical diffraction element, two regions are alternately arranged along an in-plane direction. This periodic structure constitutes a grating pattern for diffracting light. Each of the region is structured so that a plurality of medium layers having different refractive indices and/or thicknesses are stacked. When light is transmitted to the diffraction element, a phase difference occurs between the light transmitted through the regions, thus resulting in diffraction phenomenon. Due to an refractive index anisotropy of the layers, the phase difference depends on the polarization direction of linearly polarized light.

US patent application publication US 2013/0299716 A1 discloses an apparatus for generating a proton beam, which includes a laser system providing a laser pulse, a target generating a proton beam by using the laser pulse, and a phase conversion plate disposed between the laser system as a light source and the target to convert the lase pulse into a circularly polarized laser pulse having a spiral shape. The phase conversion plate may include a plurality of sectors that are divided from a circle in azimuthal direction. The sectors may include a crystal showing birefringence. The sectors may include quarter wave plates arranged in such a way as to convert the linearly polarized laser pulse into the circularly polarized laser pulse having the spiral shape. In addition, the circularly polarized laser pulse may be shifted by a phase of $2\pi$ radiance by the quarter wave plates. The quarter wave plates may generate a phase difference of an integer multiple of $2\pi$ radiance about the circularly polarized lase pulse.

In STED fluorescence light microscopy the STED light and/or the excitation light are preferably applied in very short pulses to limit a timewise overlap of these pulse with the emission of fluorescence light by a sample to be imaged. Commercial light sources, i.e. pulsed lasers for supplying excitation light and/or STED light in ultrashort pulses, display a rather wide emission wavelength bandwidth. A TI-sapphire-laser, for example, has an emission wavelength bandwidth of about 8 nm with ultrashort pulses. Known phase filters for shaping the STED light but for leaving the excitation light unaffected do not work over such a wavelength bandwidth of either the STED light or the excitation light. Particularly, the intensity of the focused shaped STED light does no longer go down to zero in the local intensity minimum at the focus point with such a wavelength bandwidth of the STED light.

There still is a need of a segmented phase plate which is capable of leaving wavefronts of light of a first wavelength unaffected whereas it purposefully shapes wavefronts of light of a second wavelength over an increased range of wavelengths of at least one of the first and second wavelengths.

SUMMARY OF THE INVENTION

The present invention relates to a segmented chromatic phase plate. The phase plate comprises a (virtual) main axis, and at least three stacks of optical flats. The at least three stacks of optical flats are arranged around the main axis. Each of the at least three stacks of optical flats comprises at least two plane-parallel optical flats made of different materials. Each of the at least three stacks is stacked along the main axis; and all of the at least three stacks have a same overall height along the main axis. The materials and the thicknesses of the optical flats in the at least three stacks are selected such that optical path lengths of light of a first wavelength passing through the different ones of the at least three stacks along the main axis differ by integer multiples of the first wavelength, whereas optical path lengths of light of a second wavelength passing through the different ones of the at least three stacks along the main axis differ by integer multiples plus defined fractions of the second wavelength. The two materials of the at least two optical flats in all of the at least three stacks have different refractive indices for both the first and second wavelengths; and the derivatives with respect to wavelength of the differences between the optical path lengths through the different ones of the at least three stacks are zero at at least one of the first and second wavelengths.

Other features and advantages of the present invention will become apparent to one with skill in the art upon examination of the following drawings and the detailed description. It is to intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

According to the present invention, a segmented chromatic phase plate comprises a main axis and at least three stacks of optical flats. These at least three stacks are arranged around the main axis. Each stack comprises at least two plane-parallel optical flats made of different materials.

Each of the at least three stacks is stacked along the main axis, and each of the at least three stacks has same overall height along the main axis. The materials and the thicknesses of the optical flats in the at least three stacks are selected such that optical path lengths of light of a first wavelength passing through the different one of the at least three stacks along the main axis differ by integer multiples of the first wavelength, whereas optical path lengths of light of a second wavelength passing through the different ones of the at least three stacks along the main axis differ by integer multiples plus defined fractions of the second wavelength. The two materials of the at least two optical flats in all of the at least three stacks have different refractive indices for both the first and second wavelengths; and derivatives of the differences between the optical path lengths with respect to wavelengths are zero at at least one of the first and second wavelengths.

The differences between the optical path lengths, whose derivatives with respect to wavelengths are zero, are the differences of integer multiples of the first wavelength or of integer multiples plus defined fractions of the second wavelength, respectively, i.e. they are relative differences or differences normalized to the respective first or second wavelength.

By selecting two materials for two of the at least two optical flats in all of the at least three stacks that have different refractive indices for both the first and second wavelength instead of looking for two materials which have same refractive indices for the first wavelength, a further degree of freedom is obtained which is available for adjusting the derivatives of the differences between the optical path lengths with respect to wavelength to zero at at least one of the first and second wavelength.

Although the integer multiples of the first or second wavelength may also be zero in the differences between the optical path lengths through the at least three stacks at the first and second wavelength, these integer multiples will typically clearly differ from zero in the present invention.

The actual integer multiples of the first wavelength by which the optical path lengths of light of the first wavelength differ reflect the additional degree of freedom obtained by using different materials having different refractive indices also for the first wavelength. With same refractive indices of the two materials for the first wavelength, the integer multiples of the first wavelength by which the optical path lengths of the light of the first wavelength differ would always be zero.

If the at least three stacks are all consisting of optical flats made of the same materials, single ones of the optical flats made of each one of these materials may be missing in some of the stacks. Particularly, no or one optical flat per each one of these materials may be missing in the entirety of the at least three optical flats. Typically, only one optical flat will be missing per stack, but this is no requirement with the segmented phase plate according to the present invention. In any case, even each stack in which any optical flat is missing still comprises at least two plane-parallel optical flats made of different materials.

The sequence of the materials of the at least two optical flats in the at least three stacks has no influence on the differences between the optical path lengths through the at least three stacks. Thus, the sequence of the materials of the at least two optical flats in the at least three stacks may be altered without modifying the optical properties of the segmented chromatic phase plate.

The definition of the segmented chromatic phase plate in the claims are of such a kind that they may be easily implemented as search criteria for automatically searching for suitable materials and thicknesses of the optical flats in the at least three stacks. The selection of the materials may be restricted to all materials available from a certain manufacturer at reasonable conditions, or the materials from which the selection is made may include all materials from two or more manufacturers. The thicknesses of the optical flats in the at least three stacks may then be calculated as those solutions of a system of equations for each of all available combinations of materials. The actual materials and thicknesses may finally be selected from these solutions according to further criteria, like for example ease of manufacture, cost of materials and so on.

Thus, the segmented chromatic phase plate according to the present invention is not only new due to its features but also due to how these features are defined for easily making the required selection of materials and thicknesses of its optical flats.

Due to the feature that derivatives of the differences between the optical path lengths with respect to wavelengths is zero at at least one of the first and second wavelengths, the segmented chromatic phase plate is non-sensitive with regard to variations or broad wavelength bandwidths of the light of the first and/or second wavelengths. Particularly, it is perfectly suited for ultrashort light pulses of a considerable wavelength band width in the order of up to 10 nm and more.

In the phase plate according to the present invention, the materials of the at least two optical flats may be the same in all of the at least three stacks. This will typically result in that thicknesses of those optical flats made of the same materials and stacked in different ones of the at least three stacks are different. That the materials of the at least two optical flats of all of the at least three stacks are the same does not necessarily mean that the materials of all the at least two optical flats are the same. Instead, all stacks may comprise a further optical flat which is made of different materials in the various stacks. Preferably, however, all of the at least two optical flats, i.e. all optical flats of all of the at least three stacks, i.e. of all stacks, may be made of the same materials such that the number of materials is equal to the number of optical flats in each of the stacks.

Similarly, the feature of the phase plate according to the present invention that the two materials of the at least two optical flats of all of the at least three stacks have different refractive indices for both the first and second wavelength does not exclude that each stack has a further optical flat made of a further material having a different refractive index with regard to the two materials of the at least two optical flats for one of the first and second wavelength but a same refraction index for the other one of the first and second wavelength as one of the two materials of the at least two optical flats. Nevertheless, it is preferred in the phase plate according to the present invention that all the materials of all of the at least two optical flats of all of the at least three stacks have different refractive indices for both the first and second wavelength.

Particularly, in the phase plate according to the present invention, each stack may comprise at least three plane-parallel optical flats made of different materials; the materials of the at least three optical flats of all of the at least three stacks may be the same, and the materials of the at least three optical flats of all of the at least three stacks may have different refractive indices for both the first and second wavelength.

With three or even more optical flats in each of the at least three stacks, the desired properties of the phase plate according to the present invention may be achieved over a larger band of wavelengths extending around the first and/or second wavelength. Thus, the degree of freedom achieved by means of the third optical flat in each stack of optical flats may be used to have the derivatives of the differences between the optical path lengths with respect to wavelengths of zero at both the first and the second wavelength, or it may be used to keep the derivatives of the differences between the optical path lengths with respect to wavelengths close to zero over an extended band of wavelengths around the first or second wavelength.

An increasing number of optical flats in each of the stacks may also be used to form a step-like curve of the differences between the optical path lengths with respect to wavelengths in a wavelength range including the first and second wavelengths. In STED fluorescence light microscopy, the wavelength of the STED light will usually be more than 10% longer than the wavelength of the excitation light. Nevertheless, a steep step of the course of the differences between the optical path length normalized to the wavelength allows to use the phase plate of the present invention for excitation light of a maximum wavelength at one time and for STED light of minimum wavelength at another only differing by less than 10% or even less than 5 of the excitation wavelength.

In the phase plate according to the present invention, differences between the thicknesses of those optical flats made of the same materials and stacked in different ones of the at least three stacks may be at least 10 μm, particularly at least 20 μm or even at least 50 μm. These differences between the optical flats made of the same material ensure that the phase plate according to the present invention may be manufactured at low cost. The lower limit for the differences between the thicknesses of the optical flats made of the same material may add a further equation to the system of equations to be solved for selecting appropriate sets of materials and thicknesses of the optical flats for the phase plate according to the present invention.

Further, in the phase plate according to the present invention, the same overall height of each of the at least three stacks may be at least 3 mm, and particularly in a range from 5 mm to 20 mm. With a higher number of optical flats per stack, the overall height of each of the at least three stacks may also be considerably higher than 20 mm. With five optical flats per stack it may, for example be about 40 mm to 60 mm. The overall height of the stacks has both an influence on the cost of manufacture and the ease of handling the phase plate according to the present invention. The ease of handling also includes whether the phase plate according to the present invention may be positioned within an existing fluorescence light microscope to transform it into an STED fluorescence light microscope, for example. A particularly long phase plate does not only require a lot of space along the optical axis but also requires particularly well collimated light of the first and second wavelength.

Further, in the phase plate according to the present invention, the thickness of each optical flat of all the at least three stacks should be at least 1.0 mm, particularly at least 2.0 mm or even at least 3.0 mm. This minimum thickness of each optical flat is also a matter of manufacturing cost. Further, a rather high minimum thickness of each optical flat allows for making each plane-parallel optical flat of two wedge-shaped parts of a same material and of a same wedge angle. Moving the parts in overlapping direction changes the thickness of the respective optical flat. In this way, the thickness of the respective optical flat can be adjusted at a very high precision controlled by an interferometer, for example. The contours of each optical flat in those directions perpendicular to the main axis may be defined afterwards, i.e. after defining the thickness of the optical flats by moving their parts relative to each other and fixing their relative position at the desired thickness of the respective optical flat.

Further, in the phase plate according to the present invention, all differences between the refractive indices of all the materials of all the optical flats of all the at least three stacks should be at least ten times a maximum diffraction index tolerance of the materials involved in the respective difference. This feature of a requirement to the phase plate according to the present invention ensures that the materials and thicknesses selected will in fact provide the desired properties of the phase plate. Too high maximum diffraction index tolerances put achieving the desired properties of the phase plate at a risk, even if its optical flats are manufactured at very low tolerances in thickness.

A difference between the diffraction indices of the two materials of the at least two optical flats of all of the at least three stacks may be in a rather low range. Particularly, they may be in a range from 0.1% to 1%. Rather low differences between the diffraction indices of the two materials mean rather high differences in thickness of the at least two optical flats of the two materials in the stacks of the phase plate according to the present invention. These rather high differences in thickness make manufacturing the phase plate according to the present invention particularly easy.

Not only the difference between the diffraction indices of the two materials of the at least two optical flats of all of the at least three stacks but also a difference between the refractive indices of two further materials of two further optical flats of all of the at least three stacks may be rather low, i.e. particularly in the range from 0.1% to 1%. Even all differences between the refractive indices of all the materials of all the optical flats of all the at least three stacks may be in this rather low range.

To achieve optimum overall properties of the phase plate according to the present invention, the at least three stacks may be cemented between a pair of plane-parallel cover plates. A distance between these two cover plates may be defined by spacers. These spacers may be placed farther away from the main axis than the at least three stacks. With the aid of the spacers, small differences in overall height between the stacks due to manufacturing tolerances may be compensated for. Actually, these differences will be compensated by the cement used for cementing the optical flats one onto the other and for cementing the stacks of optical flats between the cover plates.

In the phase plate according to the present invention, the defined fractions of the second wavelength by which the optical path lengths of the light of the second wavelength passing through the different ones of the at least three stacks along the main axis differ in addition to the integer multiples of the second wavelength may be adjusted such that the light of the second wavelength exciting the phase plate, when focused to a focus point, displays a local intensity minimum in the focal point. This desired effect of the phase plate according to the invention is particularly achieved in that the defined fractions of the second wavelength by which the optical path lengths of the light of the second wavelength passing through neighboring ones of the at least three stacks along the main axis differ in addition to the integer multiples of the second wavelength are $n^{th}$ fractions or $1/n$ of the second wavelength, n being the number of the at least three stacks. This includes that the defined fractions may be $(1-1/n)$ times the second wavelength, as the value of this difference in optical path length is $1/n$ from the point of view of the next higher integer multiple of the second wavelength: $(1-1/n)-1=-1/n$.

In case of four stacks, the defined fractions are ¼ of the second wavelength. These fractions of the second wavelength may particularly be combined with stacks arranged around the optical axis in a pie slice pattern of pie slices of equal size. With such a pie slice pattern of four pie slices, the quality of the local intensity minimum in the focus point is only reduced by about 10% as compared to an ideal "phase clock" by which the phase of wave fronts of the second wavelength is continuously increased from zero to $2\pi$ over one turn around the main axis. With a pie slice pattern of six pie slices this difference is only about 1% so that such a phase plate according to the invention is nearly as good as an ideal "phase clock", and additionally allows for also passing through the light of the first wavelength without affecting its local intensity maximum in the focus point when focused.

The phase plate according to the present invention may comprise further stacks of optical flats not directly arranged around the main axis but around the at least three stacks directly adjoining the main axis. By means of the further stacks of optical flats, a light intensity distribution of the light of the second wavelength may be achieved which also encloses its local intensity minimum at the focus point in z-direction perpendicular to the focal plane.

Figure 1:
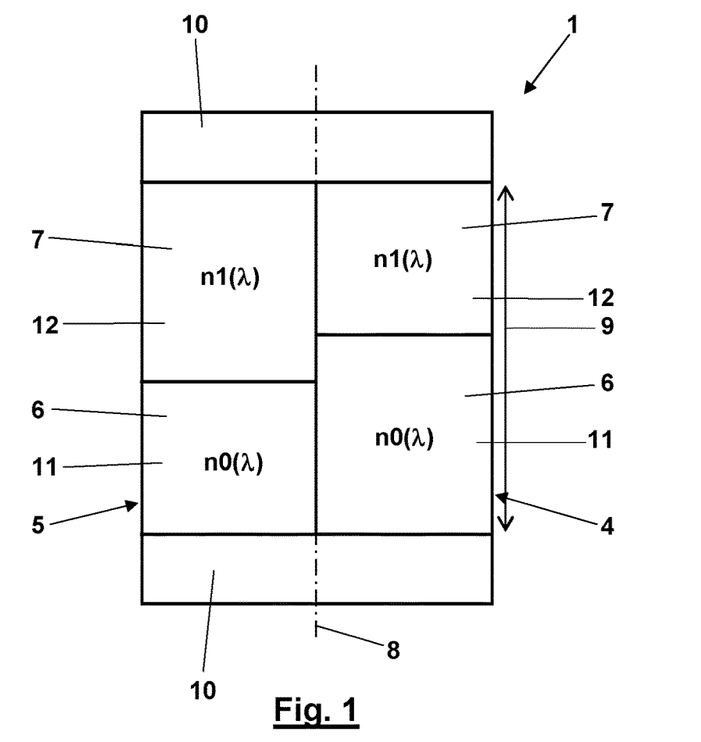
FIG. 1 is a side view of a first embodiment of the phase plate according to the present invention.
Figure 2:
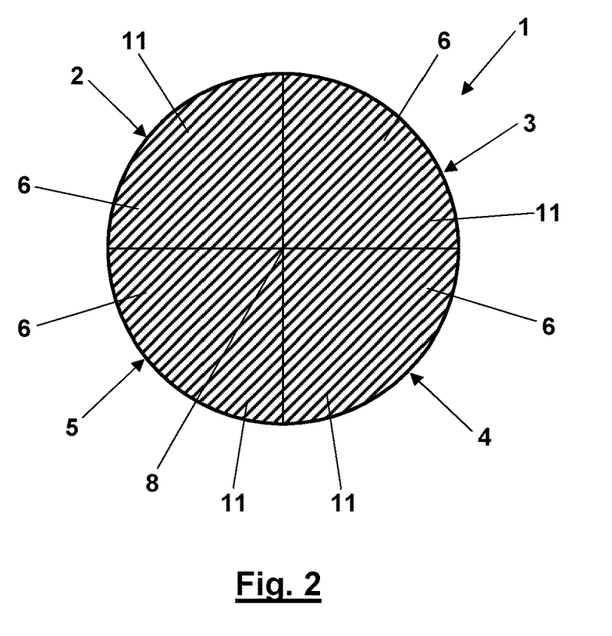
FIG. 2 is a section through the phase plate according to FIG. 1 running perpendicular to a main axis of the phase plate.

The segmented chromatic phase plate 1 depicted in FIGS. 1 and 2 comprises four stacks 2 to 5 essentially consisting of plane-parallel optical flats 6 and 7. The four stacks 2 to 5 are arranged around a main axis 8 of the phase plate 1, and their optical flats 6 and 7 are stacked along the main axis 8. Each of the stacks 2 to 5 has a same overall height 9 along the main axis 8. This overall height 9 is in a typical range of 5 mm to 20 mm. The stacks 2 to 5 are cemented between a pair of plane-parallel cover plates 10. The phase plate 1 including the cover plates 10 is one fixed unit. This fixed unit may particularly be arranged in the common beam paths of excitation light and stimulation light in an STED microscope in an area, where both the excitation light and the stimulation light are collimated. The stacks 2 to 5 of the phase plate 1 are designed such as to shape the wavefronts of the stimulation light in such a way that the stimulation light, when focused into a focus point, displays a local intensity minimum or zero intensity point at the focus point, whereas the excitation light, although also passing through the phase plate 1 along the main axis 8, still displays its maximum intensity at the focus point when focused together with the stimulation light. To achieve this desired effect, optical path lengths of the stimulation light through the phase plate 1 along the main axis 8 differ by integer multiples of the wavelengths of the stimulation light plus a quarter of the wavelength of the stimulation light between each pair of the stacks 2 to 5 following to each other in circumferential direction around the main axis 8. The optical path lengths of the excitation light, on the other hand, differ by integer multiples of the wavelengths of the excitation light. One or both of the integer multiples of the stimulation light and the excitation light may be zero, and they may be the same or different for the stimulation light and the excitation light and for any of the pairs of neighboring stacks 2 to 5.

The above differences in optical path lengths are adjusted in that materials 11 and 12 of the two optical flats of each of the stacks 2 to 5 have different refractive indices $n0(\lambda)$ and $n1(\lambda)$ for both the stimulation light and the excitation light. The materials 11 and 12 of the two optical flats 6 and 7 of all the four stacks 2 to 5 are the same, but the thicknesses of the optical flats 6 and 7 along the main axis 8 are different in all of the four stacks 2 to 5. These thicknesses, in combination with the refractive indices $n0(\lambda)$ and $n1(\lambda)$ are further selected such as derivatives of the differences between the optical path length through neighboring stacks 2 to 5 with respect to wavelengths are zero at at least one of the stimulation wavelength and the excitation wavelength, preferably at both the stimulation wavelength and the excitation wavelength. This allows for a rather broad wavelength bandwidth of the stimulation and/or excitation light and thus for using low cost pulsed light sources for providing the stimulation and/or excitation light.

The materials 11 and 12 and the thicknesses of the optical flats 6 and 7 along the optical axis may be selected from a number of available materials and easily manufactured thicknesses based on the criteria of the same overall height 9 of the stacks 2 to 5, of the different differences in optical path lengths for a first and a second wavelength as exemplified above for excitation light and stimulation light in an STED microscope, and of derivatives of the differences between the optical path lengths with respect to wavelengths being zero at at least one of the first and second wavelength. These criteria may be easily implemented in a search profile enabling a computer-based search for suitable materials 11 and 12 from the available materials and easily manufactured thicknesses.

Figure 3:
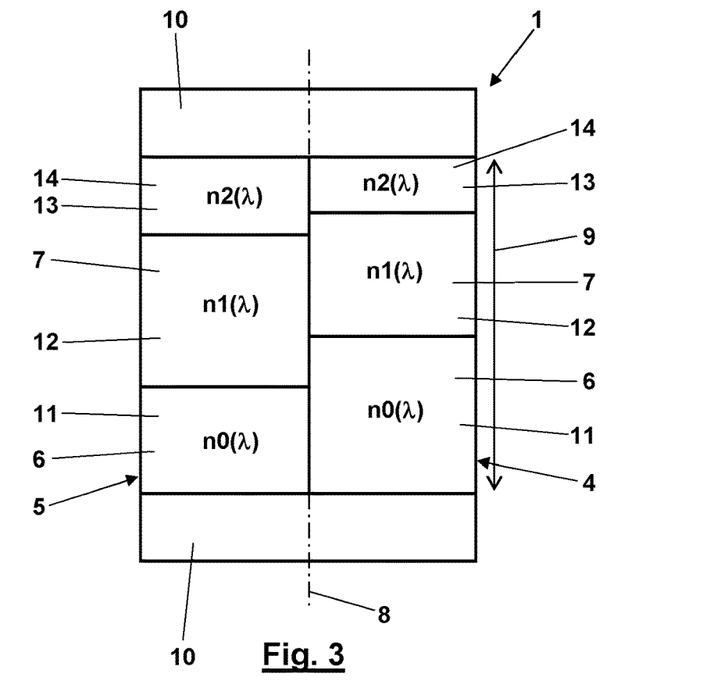
FIG. 3 is a side view of a further embodiment of the phase plate according to the present invention.

This search becomes easier and/or may involve further criteria, like for example minimum thicknesses of the optical flats 6 and 7 and/or minimum differences in thickness between the optical flats 6 and the optical flats 7 made of the same material 11 or 12, respectively, if the number of optical flats per stack is increased. FIG. 3 shows an embodiment of the phase plate 1 with three plane-parallel optical flats 6, 7 and 13, made of three different materials 11, 12 and 14 of three different refractive indices $n0(\lambda)$, $n1(\lambda)$ and $n2(\lambda)$ for both the first and second wavelength.

Figure 4:
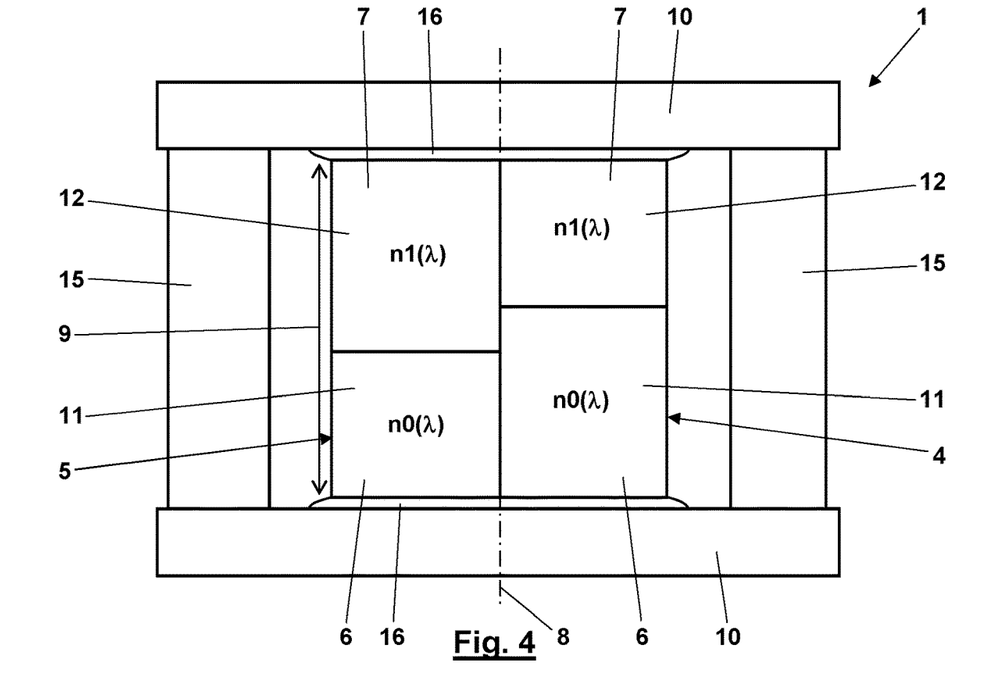
FIG. 4 is a side view of even a further embodiment of the phase plate according to the present invention.

The embodiment of the phase plate 1 according to FIG. 4 differs from that one of FIG. 1 in that the cover plates 10 extend beyond the stacks 2 to 5 in a direction away from the main axis 8, where the distance between the cover plates 10 is defined by spacers 15. The stacks 2 to 5 are cemented between the cover plates 10. This means that their optical flats 6 and 7 are cemented together, that the stacks 2 to 5 are cemented together and that they are fixed between the cover plates 10. Some cement 16 is used to compensate for tolerances between the overall height 9 of the stacks 2 to 5 and the distance between the cover plates 10 defined by the spacers 15. Obviously, the number of optical flats 6 and 7 per stack 2 to 5 may also be increased in the embodiment of the phase plate 1 according to FIG. 4.

Figure 5:
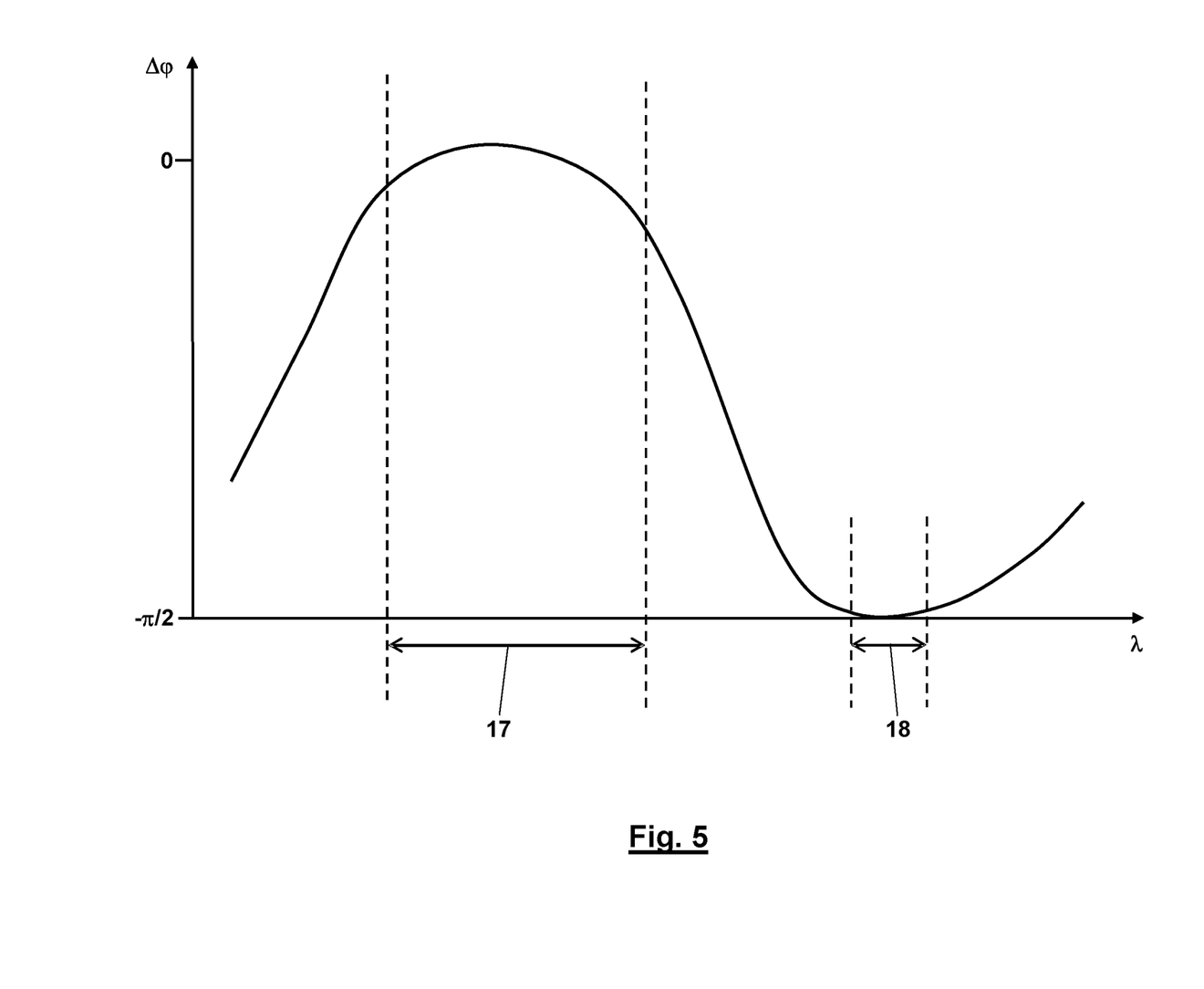
FIG. 5 is a graph indicating the phase difference between neighboring stacks of optical flats of the phase plate according to the present invention over the wavelength of light passing through the neighboring optical flats.

FIG. 5 depicts the phase difference $\Delta\varphi$ between neighboring stacks in the phase plate according to any of the FIGS. 1 to 4 plotted against the wavelength $\lambda$ of the light propagating along the main axis. This phase difference $\Delta\varphi$ is $2\pi$ times a difference $\Delta OPL$ in optical path lengths divided by the wavelength $\lambda$ of the light. The phase difference $\Delta\varphi$ is depicted modulo $2\pi$, i.e. integer multiples of the wavelength $\lambda$ are neglected in the difference $\Delta OPL$ in optical path lengths. The course of the phase difference $\Delta\varphi$ over the wavelength $\lambda$ displays two areas with low variation of the phase difference $\Delta\varphi$ with the wavelength $\lambda$ at $\Delta\varphi=0$ and $\Delta\varphi=-\pi/2$. In STED microscopy, the area 17 at $\Delta OPL=0$ is a suitable area of excitation light and the area 18 at $\Delta OPL=-\pi/2$ is a suitable area of stimulation light. The derivative of the phase difference $\Delta\varphi$ with respect to wavelengths, i.e. $\delta\Delta\varphi/\delta\lambda$, displays a zero point both in the excitation area 17 at a first wavelength and in the stimulation area 18 at a second wavelength.

Figure 6:
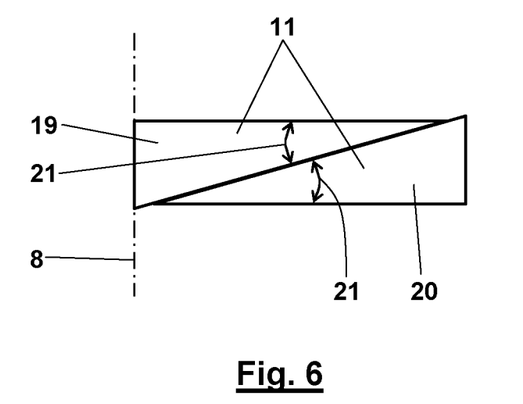
FIG. 6 is a side view of a plane-parallel optical flat of an embodiment of the phase plate according to the present invention, the plane-parallel optical flat comprising two wedge-shaped parts of a same wedge angle.

FIG. 6 shows a single plane-parallel optical flat 6 consisting of two wedge-shaped parts 19 and 20 of a same wedge angle 21. If these two parts 19 and 20 abutting against each other are moved relative to each other in the direction of their overlapping, i.e. about perpendicularly to the main axis 8, the thickness of the plane-parallel optical flat 6 along the main axis 8 is varied. This variation may be used to adjust a desired thickness of the plan-parallel optical flat 6 at a high precision, with the aid of an interferometer, for example. Some or even all of the plane-parallel optical flats 6, 7 and 13 of the segmented phase plate 1 according to the present invention may consist of two wedge-shaped parts for adjusting their thickness along the main axis 8.

Figure 7:
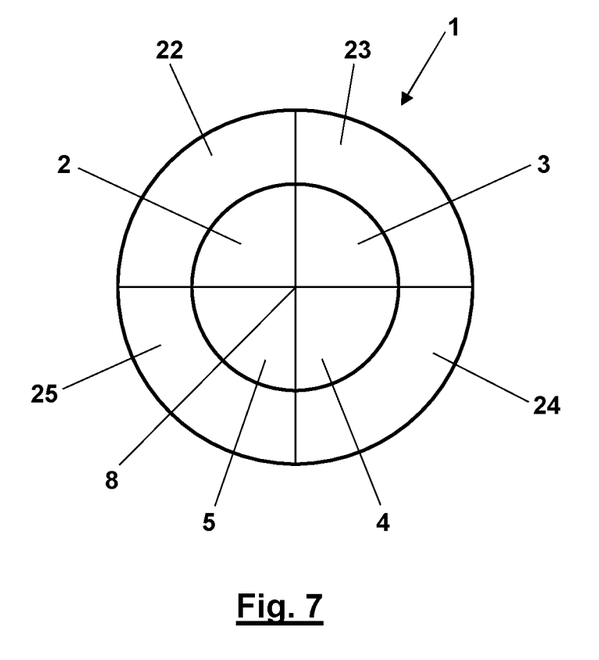
FIG. 7 is a top view of a first 3D embodiment of the phase plate according to the present invention.

FIG. 7 shows a segmented phase plate 1 which, in addition to the four stacks 2 to 5 which are arranged in a pie slice pattern of pie slices of equal size around the main axis 8, comprises four further stacks 22 to 25 of optical flats arranged around the four stacks 2 to 5. These additional stacks 22 to 25 allow for additionally delimiting the local intensity minimum of the stimulation light in STED microscopy in z-direction of the main axis 8.

Figure 8:
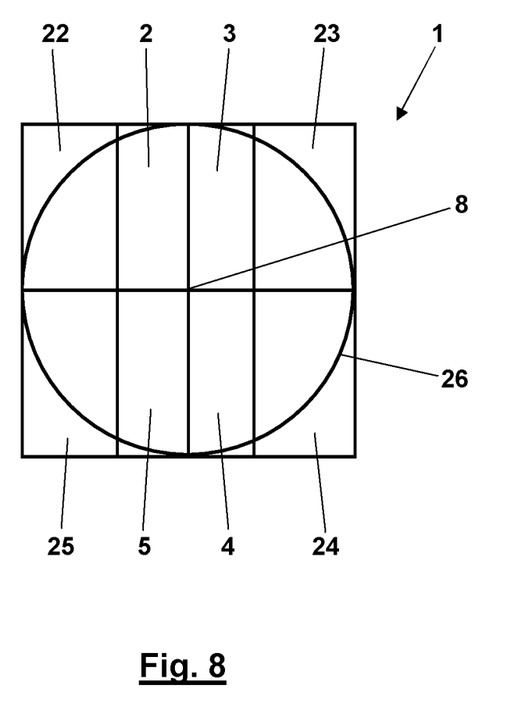
FIG. 8 is a top view of a second 3D embodiment of the phase plate according to the present invention.

FIG. 8 shown another phase plate 1 comprising a total number of eight stacks 2 to 5 a and 22 to 25 which may have a similar effect as the eight stacks 2 to 5 and 22 to 25 according to FIG. 7 but which are of a rectangular cross-section so that their optical flats are more easily manufactured than the optical flats of the stacks according to FIG. 7. A circle 26 in FIG. 8 indicates the cross-section of the beam paths of the light passing through the phase plate 1 along the main axis 8.

According to the present invention, the following examples of phase plates usable in STED microscopy have been selected from the glasses or materials available from Schott, considering a first wavelength of the excitation light and a second wavelength of the stimulation light as indicated. The number of suitable combinations significantly increases if glass types from further manufacturers such as Hoya, Ohara etc. are included. Even with the glass types from Schott, only, there are many other combinations with similar performance.

First Example: Stack of 2 Layers
Stimulation wavelength: 775 nm
Excitation wavelength: 630 nm

| Opical flat in stack | Material (Schott) | step size/ segment of circle |
|---|---|---|
| 0 | N-SK4 | 0.135 mm |
| 1 | N-KZFS4HT | −0.135 mm |

Stimulation light wavelength acceptance range: 740-820 nm (1% zero at edge of range)
Excitation light wavelength acceptance range: 590-690 nm
Total thickness: ca. 8 mm Here, the derivatives of the differences between the optical path lengths with respect to wavelength are zero at the excitation wavelength, only.

Wide STED Range Example: Stack of 4 Layers
STED design wavelength: 775 nm
Excitation design wavelength: 630 nm

| Optical flat in stack | Material (Schott) | step size/ segment of circle |
|---|---|---|
| 0 | N-LAK7 | 0.878 mm |
| 1 | SF2 | −0.871 mm |
| 2 | N-LAK21 | −1.338 mm |
| 3 | N-KZFS11 | 1.331 mm |

STED Acceptance range: 705-825 nm (1% zero at edge of range)
Excitation acceptance range: 610-660 nm
Total thickness: ca. 15 mm Wide Excitation Range Example: Stack of 5 Layers
STED design wavelength: 800 nm
Excitation design wavelength: 600 nm

| Optical flat in stack | Material (Schott) | step size/ segment of circle |
|---|---|---|
| 0 | SF56A | −3.837 mm |
| 1 | N-SF11 | 8.257 mm |
| 2 | P-LAF37 | −2.873 mm |
| 3 | LAFN7 | −8.355 mm |
| 4 | N-LAK34 | 6.809 mm |

STED Acceptance range: 715-810 nm (1% zero at edge of range)
Excitation acceptance range: 560-665 nm
Total thickness: ca. 50 mm Notes:

One of the optical flats per material may have a thickness of zero i.e. it may be not physically present in the stack.

The total thickness results from a production dependent minimal thickness of the elements plus the cover plates required at the top and bottom of the stack.

Many variations and modifications may be made to the preferred embodiments of the invention without departing substantially from the spirit and principles of the invention. All such modifications and variations are intended to be included herein within the scope of the present invention, as defined by the following claims.

I claim:

1. A segmented chromatic phase plate comprising:
    a main axis, and
    at least three stacks of optical flats,
        the at least three stacks of optical flats being arranged around the main axis,
        each of the at least three stacks of optical flats comprising at least two plane-parallel optical flats made of different materials,
        each of the at least three stacks being stacked along the main axis, and
        all of the at least three stacks having a same overall height along the main axis,
    wherein the materials and thicknesses of the optical flats in the at least three stacks are selected such that optical path lengths of light of a first wavelength passing through the different ones of the at least three stacks along the main axis differ by integer multiples of the first wavelength, whereas optical path lengths of light of a second wavelength passing through the different ones of the at least three stacks along the main axis differ by integer multiples plus defined fractions of the second wavelength;
    wherein the two materials of the at least two optical flats in all of the at least three stacks have different refractive indices for both the first and second wavelengths; and
    wherein derivatives with respect to wavelength of differences between the optical path lengths through the different ones of the at least three stacks are zero at at least one of the first and second wavelengths.

2. The segmented chromatic phase plate of claim 1, wherein the two materials of two of the at least two optical flats of each of the at least three stacks are the same in all of the at least three stacks.

3. The segmented chromatic phase plate of claim 2, wherein differences between the thicknesses of those optical flats made of the same one of the two materials and stacked in different ones of the at least three stacks are at least 10 μm.

4. The segmented chromatic phase plate of claim 2, wherein not more than one optical flat of each of these two materials is missing in any of the at least three stacks.

5. The segmented chromatic phase plate of claim 1, wherein each of the at least three stacks comprises at least three plane-parallel optical flats made of different materials.

6. The segmented chromatic phase plate of claim 5, wherein the materials of the at least three optical flats are the same in all of the at least three stacks.

7. The segmented chromatic phase plate of claim 6, wherein differences between the thicknesses of those optical flats made of the same one of the two materials and stacked in different ones of the at least three stacks are at least 10 μm.

8. The segmented chromatic phase plate of claim 6, wherein the three materials of the at least three optical flats have different refractive indices for both the first and second wavelengths.

9. The segmented chromatic phase plate of claim 1, wherein the first and second wavelengths differ by less than 10% of the first wavelength.

10. The segmented chromatic phase plate of claim 1, wherein the same overall height of all of the at least three stacks is in a range from 5 mm to 20 mm.

11. The segmented chromatic phase plate of claim 1, wherein the thickness of each of the optical flats of all the at least three stacks is at least 1.0 mm.

12. The segmented chromatic phase plate of claim 1, wherein at least one of the plane-parallel optical flats comprises two wedge-shaped parts of a same wedge angle.

13. The segmented chromatic phase plate of claim 1, wherein all differences between the refractive indices of all the materials of all the optical flats of all of the at least three stacks are at least 10 times a maximum refractive index tolerance of the materials involved in the respective difference.

14. The segmented chromatic phase plate of claim 1, wherein a difference between the refractive indices of the two materials of the at least two optical flats of all of the at least three stacks is in a range from 0.1% to 1%.

15. The segmented chromatic phase plate of claim 1, wherein all of the at least three stacks are cemented between a pair of plane-parallel cover plates.

16. The segmented chromatic phase plate of claim 15, wherein a distance between the two cover plates is defined by spacers.

17. The segmented chromatic phase plate of claim 1, wherein the defined fractions of the second wavelength by which the optical path lengths of the light of the second wavelength passing through the different ones of the at least three stacks along the main axis differ in addition to the integer multiples of the second wavelength are adjusted such that the light of the second wavelength the phase plate, when focused to a focus point behind the phase plate, displays a local intensity minimum in the focus point.

18. The segmented chromatic phase plate of claim 1, wherein the defined fractions of the second wavelength by which the optical path lengths of the light of the second wavelength passing through neighboring ones of the at least three stacks along the main axis differ in addition to the integer multiples of the second wavelength are $n^{th}$ fractions of a second wavelength, n being the number of the at least three stacks.

19. The segmented chromatic phase plate of claim 1, wherein the at least three stacks are arranged around the main axis in a pie slice pattern of pie slices of equal size.

* * * * *